United States Patent [19]

Therkildsen

[11] 4,026,386
[45] May 31, 1977

[54] LUBRICATION SYSTEM FOR SPLINE CONNECTION

[75] Inventor: Henry T. Therkildsen, East Peoria, Ill.

[73] Assignee: Caterpillar Tractor Co., Peoria, Ill.

[22] Filed: Aug. 22, 1975

[21] Appl. No.: 607,074

[52] U.S. Cl. .................................. 184/7 R; 184/43
[51] Int. Cl.² ................................................ F01M 1/06
[58] Field of Search ............ 184/1 R, 6, 6.11, 6.12, 184/7 R, 11 R, 11 A; 172/113 B; 64/17 A

[56] References Cited

UNITED STATES PATENTS

| | | | |
|---|---|---|---|
| 2,999,000 | 9/1961 | Spat | 184/6.11 |
| 3,380,555 | 4/1968 | Myers | 184/6 |
| 3,548,971 | 12/1970 | Fisher | 184/6.12 |
| 3,601,515 | 8/1971 | Pelizzoni | 184/6.12 |
| 3,621,937 | 11/1971 | Edge | 184/6.11 |
| 3,785,458 | 1/1974 | Caldwell | 184/6.12 |
| 3,785,460 | 1/1974 | Smith | 64/17 A |
| 3,847,248 | 11/1974 | Avery | 184/1 R |

*Primary Examiner*—Samuel Feinberg
*Attorney, Agent, or Firm*—Phillips, Moore, Weissenberger, Lempio & Majestic

[57] ABSTRACT

A lubrication system is adapted for continuously lubricating a loose spline connection wherein a collar connects to a pair of shafts and axially spaced bearings rotatably mounting the collar and shafts in a closed housing. The collar is spline connected to the shafts and includes a lubricant chamber intermediate the spaced shaft ends fed by an axial lubricant passage across a control orifice in one of the shafts. Rotation of the shafts and collar causes lubricant entering the chamber to be centrifugally discharged through a standpipe extending part way into the chamber from a collar wall and thereby flow to the bearings.

7 Claims, 2 Drawing Figures

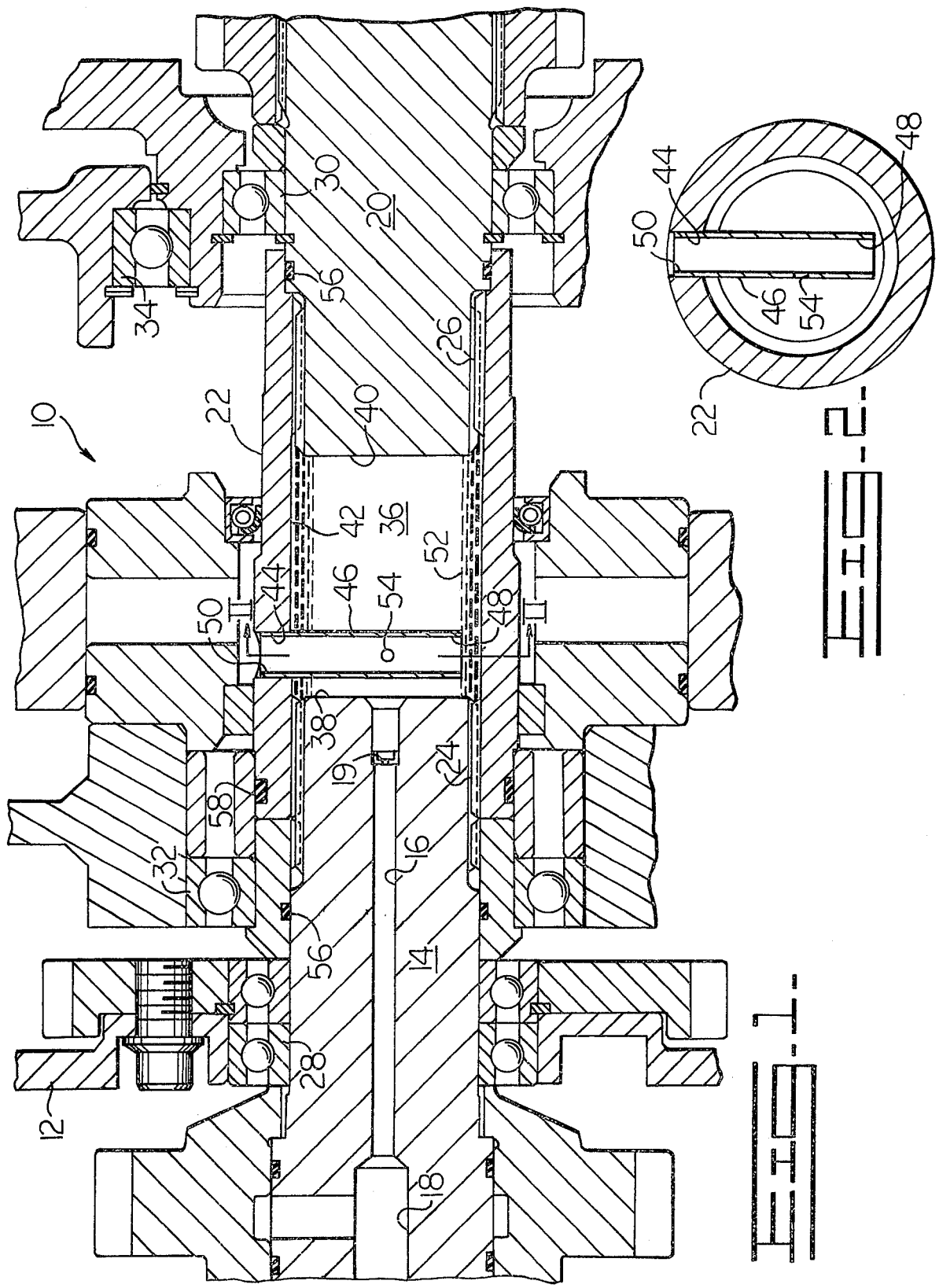

LUBRICATION SYSTEM FOR SPLINE CONNECTION

BACKGROUND OF THE INVENTION

Conventional lubrication systems for lubricating the spline connections and support bearings in transmissions, winches, etc., are frequently complex in that they use pumps, regulators, and sophisticated distribution networks. Such systems are costly to manufacture and substantially increase the initial and operating expenses by requiring additional parts and by absorbing part of the otherwise utilizable horsepower of the vehicle or machine with which the transmission, winch, etc., is used. A lubrication system overcoming many of these disadvantages is found in U.S. Pat. No. 3,785,458, assigned to the assignee of this application. However, this system which utilizes an axially disposed conducting tube is not suitable for use with a pair of axially connected shafts due to the requirement of having access to the end of the shaft on the shaft axis. Also, this sytem is not suitable for use with even a single spline-connected shaft where axial access to its ends is restricted for some reason.

While it would be possilbe to merely have a lubricant drin hole in the wall of a collar spline connecting a pair of axially aligned shafts, such systems would be unsatisfactory for various reasons.

First of all, depending on the orientation of the drain hole when the shaft stops, all of the lubricant contained in the chamber formed between the shaft ends and the joining collar might be drained out. This would result in unlubricated spline couplings for a short period after shaft rotation is commenced and would produce undesirable fretting in the splined shafts.

Secondly, the lubricant level in the chamber would be variable and would tend to either over-lubricate or under-lubricate the splines.

SUMMARY AND OBJECTS OF THE INVENTION

It is the primary object of this invention to provide a single system for dynamically and continuously lubricating by submersion, a loose spline connection.

It is another object of this invention to provide such a system which automatically maintains a set lubricant level so as to ensure by submersion, lubrication of the entire spline connection.

It is a further object to provide such a system which maintains a quantity of lubricant in contact with the spline connection even after shaft rotation has ceased so that lubricant is present when rotation is recommenced.

Other objects and advantages of this invention will become more readily apparent by having reference to the accompanying drawings and following description.

BRIEF DESCRIPTION OF THE DRAWINGS

FIG. 1 shows a partial cross-sectional view of a winch incorporating the present invention; and FIG. 2 is a cross-sectional view taken along lines II—II in FIG. 1.

DETAILED DESCRIPTION

Referring to the drawings, there is shown in FIG. 1 generally at 10 a partial cross-sectional view of a winch incorporating the present invention. It is to be undersood, however, that such is shown for illustrative purposes only and that other mechanisms, such as transmissions, etc., are also contemplated. The winch includes a housing 12 and an input shaft 14 having an axial lubricant passage 16 therein leading from an oil inlet 18, which is in turn connected to a source of lubricant pressure (not shown). Also contained in passage 16 is a control orifice 19 for reducing pressure and loss or pressurized oil from the pressure source to an acceptable value. The input shaft is connected to a second shaft 20 by means of a tubular collar 22 through spline connections 24, 26 comprising a plurality of splines.

The shafts and collar are rotatably mounted by means of a plurality of bearings 28, 30, 32, and 34.

The lubricant system of the present invention comprises a lubricant chamber 36 formed by the shaft ends (walls) 38, 40 and the collar interior wall 42. Fitted within a bore 44 on the collar intermediate the shaft end walls and extending inwardly to ensure a certain amount of oil for lubricating submerged splines is a tubular standpipe 46. The length of tube 46 determines the amount of oil remaining when rotation ceases. The length shown, which almost fills the chamber diameter, is desirable to prevent any unbalance when rotating at high speed.

In operation, lubricant enters chamber 36 through passage 16 and orifice 19. Lubricant is thus communicated to spline connections 24, 26. Upon rotation of the shafts and attaching collar, lubricant will be evenly distributed by centrifugal action onto the collar interior wall 42 so as to be in communication with and submerging all the splines of the spline connections.

Lubricant level and pressure is maintained by means of a continuous flow from the chamber 36 through the inlet opening 48 and out the outlet opening 50 of the standpipe. Lubricant will collect along the chamber walls as at 52, which shows the fluid level when the shafts and collar are rotating. From the standpipe outlet opeing lubricant circulates through the housing to lubricate the bearings. A small hole 54 may be provided in the standpipe approximately on the shaft axis to intercommunicate the chamber 36 with the standpipe interior and assist in allowing trapped air to excape the chamber 36. A low pressure in the chamber 36 reduces leakage of fluid through seals 56 and 58.

It is to be undersood that the foregoing description is merely illustrative of a preferred embodiment of the invention, and that the scope of the invention is not to be limiting thereto but is to be determined by the scope of the appended claims.

What is claimed is:

1. In a mechanism having an annular collar member defining an interior diameter attached to a first shaft by a loose spline connection, a lubricant system comprising means forming a chamber with said first shaft and the interior wall of said collar member, wherein the improvement comprises a radially directed tubular standpipe mounted in a bore in said collar member interior wall communicating said chamber with the exterior of said collar, wherein said standpipe extends inwardly more than half the diameter from its mounting point on said collar interior wall so that the amount of lubricant in said chamber is thereby controlled.

2. The mechanism of claim 1 wherein said standpipe extends to a point adjacent the collar wall opposite from its mounting point.

3. The mechanism of claim 2 wherein said first shaft defines an axis and further including a hole in said standpipe on said axis intercommunicating said chamber with the interior of the standpipe.

4. The invention of claim 1 wherein chamber forming means comprises a second shaft axially aligned with said first shaft and spline connected to said collar.

5. The mechanism of claim 1 including an axially directed lubricant inlet passage in said firt shaft communicating with said chamber.

6. The mechanism of claim 5 further including an orifice in said lubricant passage for controlling the pressure of lubricant entering said chamber.

7. The mechanism of claim 2 further including a housing and bearings rotatably mounting said shafts and collar therein.

* * * * *